Figures 1, 5:
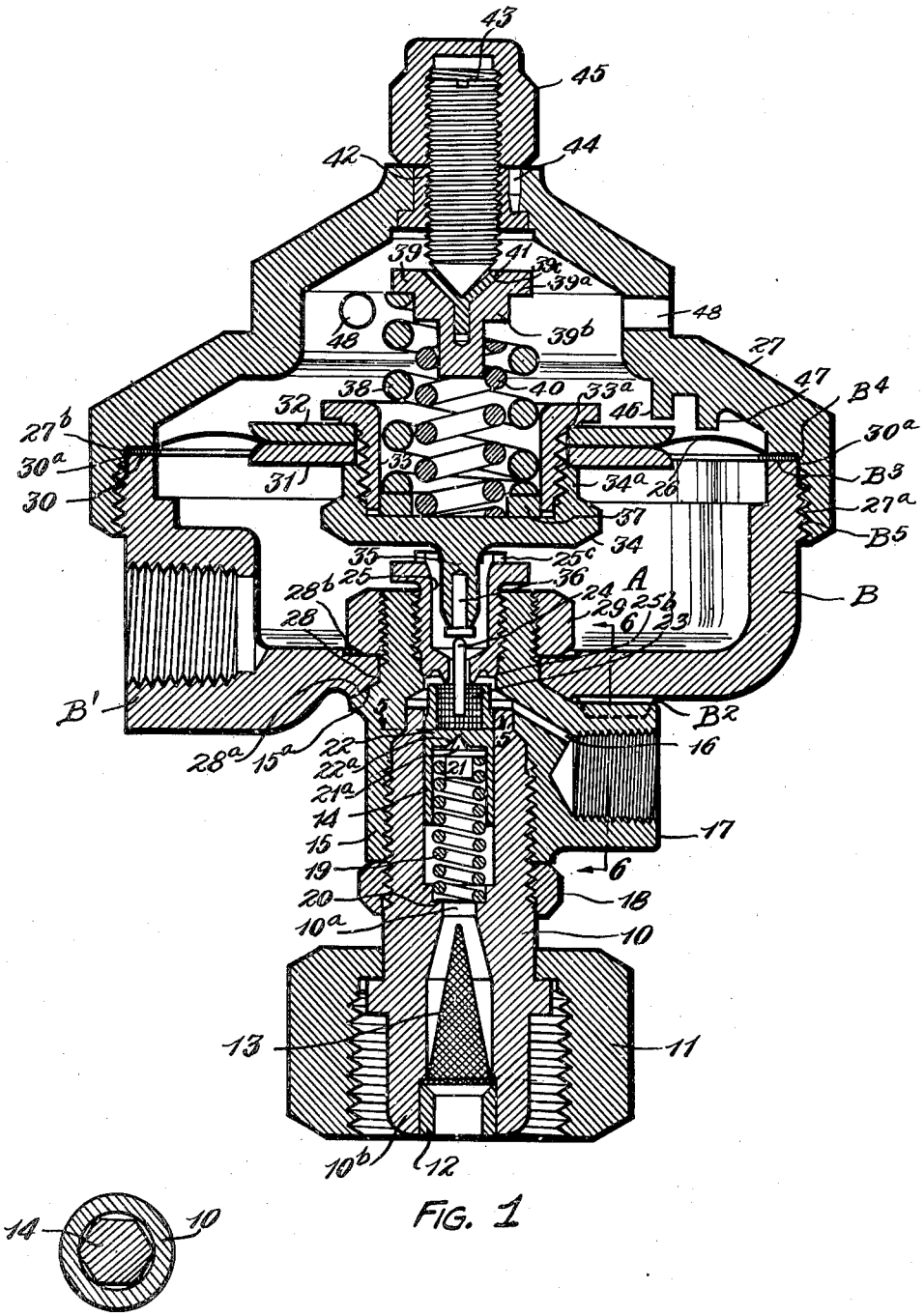

Aug. 2, 1949.  L. CAMPBELL, JR., ET AL  2,478,040
FLUID PRESSURE REGULATOR
Filed Aug. 14, 1944  2 Sheets-Sheet 2

INVENTORS
Louis Campbell, Jr. & Donald C. Schilling
BY Hull & West
ATTORNEYS.

Patented Aug. 2, 1949

2,478,040

UNITED STATES PATENT OFFICE 2,478,040

FLUID PRESSURE REGULATOR

Lorn Campbell, Jr., and Donald C. Schilling, Lakewood, Ohio; said Schilling assignor to said Campbell Application August 14, 1944, Serial No. 549,470

3 Claims. (Cl. 50—23)

This invention relates to fluid-pressure regulators. Heretofore, these regulators have been designed with the view of meeting certain limited operating conditions. As thus designed, they could not be easily altered to cope with conditions other than those inherent in their intended fields of operation. For example, it has been customary in the past, when designing a regulator especially for the purpose of handling oxygen or other gases compressed to 2200 p. s. i. or over, to use a heavy dense brass or bronze forging for the body of the regulator, irrespective of whether the oxygen delivered from the regulator should be used for welding and cutting apparatus, or for oxygen therapy, or for other purposes. In designing such a regulator, no problem arose in connection with the weight of the same; the nature and density of the metal customarily employed could be relied upon to withstand the high gas pressures to which they were subjected. Hence the weight of these regulators has been several pounds or more. However, in certain foreign countries the duties to be paid upon articles (including fluid-pressure regulators) are predicated upon the weight of the same, rather than upon their value; hence, any saving in the weight of the regulators shipped into such countries is attended with a corresponding saving in the duties payable thereon. While saving of weight is, therefore, an important objective to be achieved in respect to regulators shipped into such countries, this achievement assumes far greater proportions in respect to regulators which are used in the aviation industry, wherein oxygen systems are employed to facilitate breathing at high altitudes and wherein saving of weight, even when measured in ounces, becomes an extremely important factor in enabling the regulators to satisfy the exacting conditions surrounding their employment.

To meet the demands for light-weight regulators, efforts have been made to substitute aluminum or Duralumin for the brass or bronze forgings usually employed, but this attempted substitution has not proven practical because the nature and characteristics of these metals, plus the abrasion which takes place where moving parts are involved, renders them unsuitable for dependably holding an oxygen pressure of 2200 p. s. i. or more.

Another limitation found in fluid pressure regulators hitherto constructed is that no means were provided for altering the sensitivity of control by changing the area of the diaphragm and its housing means unless the entire regulator was redesigned.

It is the general object of our invention to produce a fluid pressure regulator which, in comparison with its predecessors, can be made either heavy or extremely light in weight and compact in construction but which will, nevertheless, be capable of reducing to any desired delivery pressure, gases which are admitted thereto, and which regulator can be constructed to function either without pressure gauges, with a gauge to indicate the downstream pressure, a gauge to indicate the upstream pressure, or with provision to mount both downstream and upstream pressure gauges. In addition to this, means are provided for altering the size of the diaphragm and the parts relating thereto without changing the valve or the gauge mounting means.

Its possession of these qualities and its ability to withstand all incidents of use to which it has been or may be subjected has rendered our regulator particularly valuable in the aviation industry and other industries.

We are able to accomplish the aforesaid general object by the regulator exemplified herein, one form of which weighs only approximately fifteen ounces (as contrasted with a weight of several pounds in regulators in general use prior to our invention). We are able further to accomplish this object without sacrificing any of such essential functions of regulators, such as convenience of access to the parts for inspection, removal, replacement or repair, and the ability to operate under a fixed set delivery pressure as well as the ability to manually change such pressure. In accomplishing the aforesaid general object we have also accomplished other and more limited, but none the less important, objects by means of the novel features of construction and arrangement of parts, which will be set forth at length hereinafter.

Among these other important objects are the following:

1. To provide a regulator consisting essentially of two units, namely: a body unit comprising a housing for the pressure responsive means and an inlet supply unit comprising a housing incorporating a valve seat, a valve and cooperating features for controlling the supply of gas under pressure to the former unit;

2. To provide a valve housing which is novel in respect to the construction and arrangement of the valve elements therewithin and by means of which maximum efficiency is obtained in the matter of controlling the delivery of gas from the cylinder to the downstream pressure chamber;

3. To enable the inlet assembly to be easily and readily changed where different standards of connections for the upstream supply are required (as is the case in regulators shipped to foreign countries) and to accomplish this exchange without the use of soldered connections or without making any change in the design of our regulator;

4. To provide the regulator with a valve seat which is readily accessible for replacement without dismantling the regulator, such facility of access and replacement being particularly desirable because the accidental entrance of dust or minute foreign particles into the regulator may result in scratching the seat or effecting a dust lodgment thereupon, resulting in a slow leak when operating under high pressures on the upstream side.

5. To provide means whereby the working area of the diaphragm may be readily and conveniently varied, whereby it is enabled to meet different operating pressure conditions, and to accomplish this variation without altering any of the other parts of the regulator.

6. To provide a construction of regulator wherein the use of soldered joints is eliminated, thereby rendering our regulator capable of being quickly and conveniently assembled and disassembled and to enable the parts thereof to be quickly and conveniently replaced.

Figure 2:
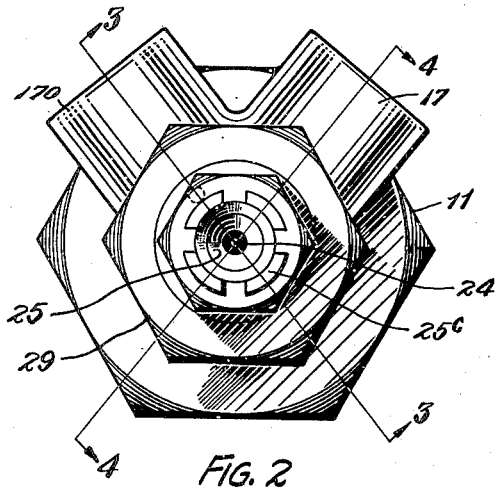
Figure 6:
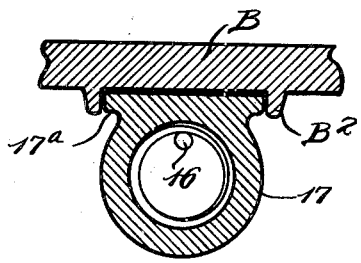
Figure 3:
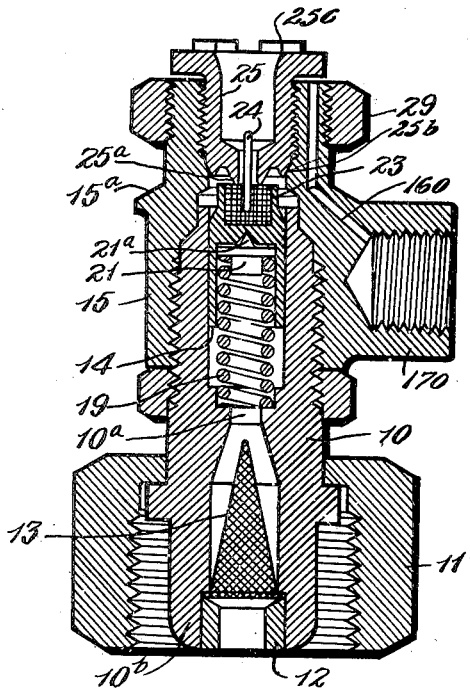
Figure 4:
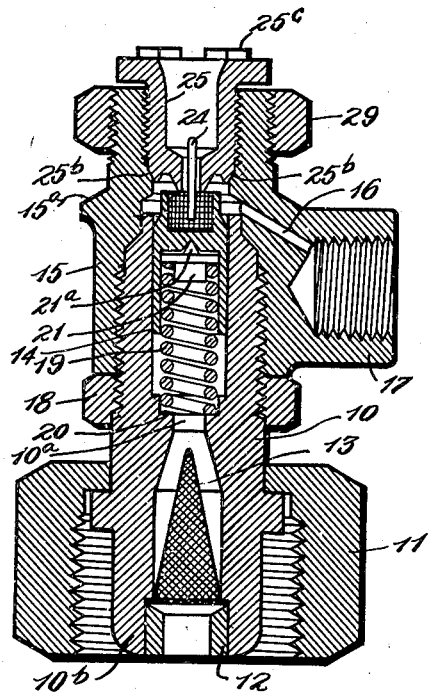

Further and more limited objects and advantages due to the construction of the regulator shown herein will be set forth in connection with the detailed description of the parts illustrated in the drawings hereof wherein our regulator as designed for use in the aviation field is shown enlarged on a 2 to 1 scale and wherein Fig. 1 represents a longitudinal central sectional view through a regulator constructed in accordance with our invention and showing the inlet unit or assembly provided with a connection for the attachment of an upstream pressure gauge; Fig. 2 an elevational view of the inlet unit or assembly showing the same provided with connections for both the upstream and downstream pressure indicating gauges; Fig. 3 a detail in section taken on the line 3—3 of Fig. 2; Fig. 4 a detail in section corresponding to the line 4—4 of Fig. 2; Fig. 5 a detail in section corresponding to the line 5—5 of Fig. 1 and Fig. 6 a detail in section corresponding to the line 6—6 of Fig. 1.

Describing the various parts illustrated herein by reference characters, 10 denotes generally the stem of the inlet unit or assembly, the stem having a passageway 10ª therethrough and being provided with a nut 11 whereby its outboard end 10ᵇ may be coupled to the appropriate portion of the valve body carried by the cylinder containing gas under pressure, such as oxygen. Mounted within the outboard end of this stem is a collar 12 carrying a filter 13, which may be made of Monel metal and which, in practice, we have made of 200 mesh.

Slidably mounted within the cylindrical inboard portion of the passageway in said stem is a sleeve 14 which is polygonal in section whereby the gas entering the said stem may flow around the exterior of the said sleeve and be delivered thence through the port 16 into the upstream gauge connection 17 which is carried by the forged housing body 15 of the inlet unit or assembly and whence it may also be delivered through a valve (to be described) into the chamber A provided between the body or housing member B and the pressure responsive diaphragm of the second unit and thence delivered in turn to the point of use through a suitable outlet, not shown, threadedly secured to the connection B'. The stem is locked in position within the body 15 by means of the lock nut 18. Also incorporated in the body 15, as will appear from Figs. 2 and 3, is a downstream gauge connection 170. This connection is placed in communication with the interior of the housing member B, when the parts are assembled, through a port 160 that opens at its end remote from said connection through the top end of the body 15.

The outboard end of the sleeve 14 is bored out for the reception of the spring 19, one end of which bears against a shoulder 20 provided therefor in the passasgeway 10ª and the other end of which engages a pivot block 21 having a conical end 21ª mounted within a corresponding seat 22ª in a wall 22 extending across the said sleeve.

At its inboard end, the sleeve is bored out to provide a chamber for the reception of the valve head 23, the face of said head being preferably formed of yieldable material, such as hard rubber, and which face has a plunger pin 24 embedded therein and projecting through a central orifice provided in the conical valve end 25ª of the nozzle 25 which is threaded into the inboard end of the body 15. The nozzle is provided with a conical seating portion 25ᵇ, adjacent to the valved end thereof and which is adapted to engage a correspondingly shaped seat on the body 15. At its opposite end, it is milled across to provide limiting stop projections 25ᶜ for the diaphragm and also to permit the flow of gas into the body of the regulator when the said stop projections shall have been engaged by the cap of the union which clamps the inner edge of the diaphragm. In practice, the inlet stem 10, the body 15, and the nozzle are preferably made of brass and the plunger pin 24 is preferably formed of phosphor bronze. The inboard end of the sleeve 14 projects beyond the corresponding end of the stem 10 and is readily removable for the purposes of access and replacement.

The chamber A is formed between the body B and the diaphragm, indicated generally at 26, the diaphragm being clamped at its periphery between the said body and the bonnet 27 which is threaded upon the end of the said body. The body B is provided with a central opening through which the inboard end of the body 15 of the inlet end of the housing extends. This opening is bounded by a cylindrical wall 28 from the outer end whereof there extends an outwardly beveled wall 28ª which is adapted to engage a correspondingly beveled or tapered wall 15ª on the body 15. Extending about the inboard end of the cylindrical wall 28 is a plane seat 28ᵇ which is adapted to be engaged by a nut 29 which is threaded upon the inboard end of the body 15. By this construction, a firm, leak-proof, but detachable connection is provided between the body or housing member B and the inlet assembly. The bodies B and 15 are held in proper relation to each other by means of ribs B² projecting from the former body and receiving therebetween flanges 17ª formed on the adjacent portion of the upstream gauge connection 17.

A light annular washer 30 is interposed between the annular clamping surface B³ of the body B and the peripheral portion of the diaphragm, thereby to provide a seal against the escape of gas, and the outer edge of the diaphragm is provided with a flange 30ª extending at substantially right angles therefrom and engaging a cylindrical seat B⁴ provided therefor on the adjacent end of the body B between the outer edge of the clamping surface B³ and the threads B⁵ which receive the threads 27ª within the flanged end of the bonnet which is provided with a cylindrical surface 27ᵇ adapted to clamp the outer surface of the flange 30ᵃ against the seat B⁴. Due to this construction, the diaphragm will be properly centralized upon the adjacent edge portion of the body B and will retain the washer in register with the surface B³. The inner portion of the diaphragm is clamped between annular plates 31 and 32, the inner edges of which are mounted upon the inner sleeve member 33 of a union, being clamped in turn against an annular seat 33ᵃ of the said member by means of the sleeved portion 34ᵃ of the outer cap member 34. This outer member carries a projection 35 which extends centrally within the nozzle 25 and has mounted axially therewithin a hardened insert 36 having a head which is adapted to engage the plunger pin 24 during the operation of the regulator. This insert is used only when the union cap is made of a soft material (such as aluminum) in order to prevent wear of the latter.

Within the union there is a washer 37 which rests against the base of the cap and forms a bearing for the inboard end of a spring 38, the outboard end of the spring bearing against an annular seat 39ᵃ provided on the spring pivot 39. Within the spring 38 and spaced therefrom is a spring 40, the inboard end of which bears against the base of the cap within the washer 37 and the outboard end of which is adapted to engage an annular seat 39ᵇ on the spring pivot 39, the central portion of the pivot projecting within the inner spring and centering the outer portion thereof. Due to the construction whereby we are enabled to clamp the inner edges of the plates 31 and 32, the support for the lower ends of the springs 38 and 40 is brought in such close relation to the valve parts therebelow that chattering and the singing noises due to the handling of gas under high pressure are largely eliminated.

The outer spring 38 functions for light delivery pressures, while the inner spring 40 comes into play and cooperates with the outer spring where higher delivery pressures are required. The spring pivot is provided with a conical seat 39ᶜ within which there is inserted a bushing 41 of hard metal, this bushing being employed where the pivot is made of light material susceptible of considerable wear.

Mounted within the outboard end of the bonnet is a collar 42 which is provided with internal threads cooperating with the external threads upon the adjusting screw 43. This collar is anchored against rotation by means of a pin 44 mounted within the adjacent portion of the bonnet. The collar is, however, used only where the bonnet is made of soft metal or plastic material. The inboard end of the adjusting screw is provided with a conical point adapted to cooperate with the correspondingly shaped recess in the bushing 41.

Where operating under a fixed pressure, the adjusting screw can be set for such pressure and sealed against alteration of such pressure by means of a nut 45 threaded upon the outer end of the screw. Where it is deemed unnecessary to operate the regulator under a fixed pressure, the adjusting screw can be replaced by one having manually operable means connected therewith.

The interior of the bonnet is provided with a plurality of bosses, one of which is indicated at 46, and which nearly contact the adjacent clamping plate 32. These bosses provide a limit stop for the upward movement of the diaphragm, which might otherwise be strained if no such limit stop were provided. Located externally of the bosses 46 are bosses, one of which is indicated at 47 and which constitute shearing points to perforate the diaphragm in case of excessive pressure and enable the gas to be liberated through a series of vent holes 48. The body B and the bonnet 27 comprises a housing for the pressure responsive means (diaphragm 26) which functions to control the supply of gas into said housing through valve mechanism mounted in a second housing comprising the stem 10 and the body 15 which contain the valve mechanism rendered operative by the pressure responsive means for regulating the pressure of gas delivered into the first housing.

Due to the construction and arrangement of parts shown and described herein, we are enabled to secure all of the objects and advantages set forth hereinbefore. The construction of the inlet assembly, in addition to accomplishing an effective means for conducting gas under pressure to the upstream and downstream pressure gauges and for controlling the supply of gas to the body of the regulator, also enables the parts of the same to be quickly and conveniently assembled and disassembled and also to be quickly and conveniently assembled upon and disassembled from the body B. Furthermore, the manner of constructing and supporting the diaphragm enables the same to be quickly and conveniently assembled within and disassembled from the regulator body and bonnet. Like ease of assembling and disassembling is accomplished through the construction of the parts which cooperate with the springs 38 and 40 in assisting to control the downstream or delivery pressure of the gas or gases from the regulator body.

Changes can be made in the size or capacity of either of the units to meet various requirements and conditions that are encountered.

Having thus described our invention, what we claim is:

1. In a fluid pressure regulator, the combination, with a housing and a pressure responsive member therein, of a housing connected to the first housing and having therein a passageway for gas under pressure, relatively movable valve members in the second housing, the said valve members controlling the flow of fluid through the passageway and into the first housing, means operative by movement of the pressure responsive member to move one of said valve members away from the other thereby to permit the pressure fluid to flow past the valve members and into the first mentioned housing, and means for detachably connecting the said housings and comprising an opening in the first housing, an externally threaded extension of the second housing projecting through said opening, and a nut threaded on said extension and adapted to engage a seat provided therefor on the inner surface of the first mentioned housing surrounding the opening therein thereby to force an external surface of the first mentioned housing which surrounds opening therein into engagement with a corresponding surface on the second housing, the external surface of the first mentioned housing and the adjacent surface of the second housing being provided the one with a projection and the other with a recess for said projection thereby to align the housings for connection and to retain them thus aligned both while and after being connected.

2. A fluid pressure regulator comprising a body housing member and a bonnet of light-weight material, an annular diaphragm having its outer peripheral portion clamped between the external portions of the body and bonnet, clamping means for the radially inner portion of the diaphragm, a spring supported at its lower end by said clamping means, a pivot block engaged by the upper end of the said spring, the pivot block being also of light-weight material and having a conical recess at its outboard end and a bushing of wear-resistant material within said recess, a collar of wear-resistant material fitted into an opening provided in the upper end of the bonnet and having an internal thread, a pivot screw threaded into the collar and having a conical inner end adapted to engage the bushing, a valve operating plunger below the said clamping means, and a hard metal insert carried by the said clamping means and adapted to actuate the said plunger.

3. In the fluid pressure regulator recited in claim 2, the clamping means comprising an upper sleeve member and a lower cap secured to the lower end of said sleeve member and provided with a centrally arranged downwardly extending projection within which the insert is mounted.

LORN CAMPBELL, Jr.
DONALD C. SCHILLING.

REFERENCES CITED

The following references are of record in the file of this patent:

UNITED STATES PATENTS

| Number | Name | Date |
|---|---|---|
| 417,135 | Bell | Dec. 10, 1889 |
| 483,979 | Foster | Oct. 4, 1892 |
| 741,267 | Neubling | Oct. 13, 1903 |
| 1,648,304 | Harris | Nov. 8, 1927 |
| 1,792,945 | VanDeventer | Feb. 17, 1931 |
| 1,814,207 | Donkin | July 14, 1931 |
| 1,842,236 | Bastian | Jan. 19, 1932 |
| 1,918,720 | Stettner | July 18, 1933 |
| 1,930,771 | Reid | Oct. 17, 1933 |
| 1,952,339 | Solenberger | Mar. 27, 1934 |
| 1,961,732 | Bastian | June 5, 1934 |
| 2,082,227 | Stettner | June 1, 1937 |
| 2,105,876 | Birch | Jan. 18, 1938 |
| 2,272,243 | Jacobson | Feb. 10, 1943 |
| 2,354,283 | St. Clair | July 25, 1944 |

FOREIGN PATENTS

| Number | Country | Date |
|---|---|---|
| 40,371 | Norway | Nov. 24, 1924 |
| 735,948 | France | Sept. 6, 1932 |